US006947945B1

(12) United States Patent
Carey et al.

(10) Patent No.: US 6,947,945 B1
(45) Date of Patent: Sep. 20, 2005

(54) USING AN XML QUERY LANGUAGE TO PUBLISH RELATIONAL DATA AS XML

(75) Inventors: Michael James Carey, San Jose, CA (US); Jayavel Shanmugasundaram, San Jose, CA (US); Eugene Jon Shekita, San Jose, CA (US); Narayana Iyer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/531,802

(22) Filed: Mar. 21, 2000

(51) Int. Cl.[7] ............................................. G06F 17/30
(52) U.S. Cl. ...................................... 707/102; 715/513
(58) Field of Search .................. 707/1–10, 100–103 R

(56) References Cited

U.S. PATENT DOCUMENTS

| | | | |
|---|---|---|---|
| 5,611,076 A | 3/1997 | Durflinger et al. | |
| 5,701,453 A | 12/1997 | Maloney et al. | |
| 5,708,828 A | 1/1998 | Coleman | |
| 5,713,014 A | 1/1998 | Durflinger et al. | |
| 5,966,707 A | 10/1999 | Van Huben et al. | |
| 5,970,490 A | 10/1999 | Morgenstern | |
| 6,408,311 B1 * | 6/2002 | Baisley et al. | 707/203 |
| 6,418,448 B1 * | 7/2002 | Sarkar | 707/104.1 |
| 6,421,656 B1 * | 7/2002 | Cheng et al. | 707/2 |
| 6,449,620 B1 * | 9/2002 | Draper et al. | 707/102 |
| 6,480,860 B1 * | 11/2002 | Monday | 707/102 |
| 6,480,865 B1 * | 11/2002 | Lee et al. | 715/523 |
| 6,507,856 B1 * | 1/2003 | Chen et al. | 715/513 |
| 6,584,459 B1 * | 6/2003 | Chang et al. | 707/3 |
| 2002/0123993 A1 | 9/2002 | Chau et al. | |

FOREIGN PATENT DOCUMENTS

WO    WO 98/34179 A1    8/1998

OTHER PUBLICATIONS

Michael Floyd, "Lab Note—Web Publishing with LivePage Enterprise," as presented on the web at http://www.webtechniques.com/archives/1999/06/note/, 7 page article dated 12/07/1999.
M. Starkey, "XML-Based Templates for Generating Artifacts from Java-Based Models," as presented on the web at http://w3.it...g_Artifacts_from_Java-Based_Models, 2 page article dated Dec. 7, 1999.
M. Carey et al. XPERANTO: Publishing object-relational data as XML. In Proc. of the Int. Workshop on Web and Databases (WebDB), 2000.

* cited by examiner

Primary Examiner—Greta Robinson
Assistant Examiner—Sathyanarayan Pannala
(74) Attorney, Agent, or Firm—Marc D. McSwain

(57) ABSTRACT

A method for publishing relational data as XML by translating XML queries into queries against an relational database. Conversion of the relational database into an XML database is not required. Each relational table is mapped to a virtual XML document, and XML queries are issued over these virtual documents. An XML query is parsed and transformed into a language-neutral intermediate representation, which is a sequence of operations describing how the output document is derived from the underlying relational tables. The intermediate representation is then translated into an SQL query over the underlying relational tables and into instructions for a tagger. The SQL query is executed, and the SQL query results are then fed into the tagger, which follows tagger instructions to generate the marked up output.

44 Claims, 9 Drawing Sheets

DEPT TABLE 300

| DNO | NAME | SIZE |
|---|---|---|
| 1 | Finance | 100 |
| 2 | Marketing | 200 |
| 3 | Sales | 50 |
| ... | | |

EMP TABLE 310

| DNO | ENO | NAME | AGE |
|---|---|---|---|
| 1 | 1 | J. Skolem | 50 |
| 2 | 2 | L. Hubbard | 33 |
| ... | | | |

Default XML View of the DEPT Table 320

```
<DEPT>
  <ROW>
    <DNO> 1 </DNO> <NAME> Finance </NAME> <SIZE> 100 </SIZE>
  </ROW>
  <ROW>
    <DNO> 2 </DNO> <NAME> Marketing </NAME> <SIZE> 200 </SIZE>
  </ROW>
  <ROW>
    <DNO> 3 </DNO> <NAME> Sales </NAME> <SIZE> 50 </SIZE>
  </ROW>
  ...
</DEPT>
```

Default XML View of the EMP Table 330

```
<EMP>
  <ROW>
    <DNO> 1 </DNO> <ENO> 1 </ENO> <NAME> J. Skolem </NAME> <AGE> 50 </AGE>
  </ROW>
  <ROW>
    <DNO> 2 </DNO> <ENO> 2 </ENO> <NAME> L. Hubbard </NAME> <AGE> 33 </AGE>
  </ROW>
  ...
</EMP>
```

FIG. 3

Query Over the Default View

```
WHERE
  <DEPT>
    <ROW>
      <DNO> $DNO </DNO> <NAME> $DNAME </NAME>
      <SIZE> $DSIZE </SIZE>
    </ROW>
  </DEPT> IN DefaultView,
  $DSIZE > 75
CONSTRUCT
  <BIGDEPT>
    <NAME> $DNAME </NAME>
    <SIZE> $DSIZE </SIZE>
    {WHERE
      <EMP>
        <ROW> <DNO> $DNO </DNO> <NAME> $ENAME </NAME> </ROW>
      </EMP> IN DefaultView
     CONSTRUCT
       <EMP> <NAME> $ENAME </NAME> </EMP>}
  </BIGDEPT>
```

XML Produced by the Query

```
<BIGDEPT>
  <NAME> Finance </NAME>
  <SIZE> 100 </SIZE >
  <EMP> <NAME> J. Skolem </NAME> </EMP>
  ...
</BIGDEPT>
<BIGDEPT>
  <NAME> Marketing </NAME>
  <SIZE> 200 </SIZE >
  <EMP> <NAME> L. Hubbard </NAME> </EMP>
  ...
</BIGDEPT>
...
```

FIG. 4

USING AN XML QUERY LANGUAGE TO PUBLISH RELATIONAL DATA AS XML

BACKGROUND OF THE INVENTION

1. Field of the Invention

This invention relates in general to accessing databases on a network, and more specifically, to translating eXtensible Markup Language (XML) queries into queries against a relational database for the purpose of publishing relational data as XML.

2. Description of Related Art

Computer systems incorporating Relational Database Management System (RDBMS) software using the Structured Query Language (SQL) interface are well known in the art. The SQL interface has evolved into a standard language for RDBMS software and has been adopted as such by both the American Nationals Standard Organization (ANSI) and the International Standards Organization (ISO).

In an RDBMS, all data is structured as tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies in its ability to join and relate information from multiple tables or views, and the ability to perform complex operations with a single statement.

An alternative data format to the tables found in an RDBMS is XML, which is a tag language for describing documents. XML is a restricted form of SGML, the Standard Generalized Markup Language defined in ISO 8879. XML is more fully described at the URL:

<www.w3.org/TR/1998/RCE-xml-19980210>

An XML document has two parts: the marked up document, and the document schema. XML documents are made up of storage units called elements, which can be nested to form a hierarchical structure. Elements can contain either parsed or unparsed data. Parsed data is made up of characters, some of which form character data, and some of which form markup. Markup encodes a description of the document's storage layout and logical structure.

XML schemas specify constraints on the structures and types of elements in an XML document. The basic schema for XML is the DTD (Document Type Definition). Other XML schema definitions are also being developed, such as XML Schema, which is described at the URL:

<www.w3.org/TR/1999/WD-xmlschema-1-19990924>

Several query languages have been proposed for searching and reformatting XML documents. One such language is XML-QL, which is described at the URL:

<www.w3.org/TR/NOTE-xml-ql>

In XML-QL, queries have the general form:
WHERE <pattern>
IN <URLs of input documents>
CONSTRUCT <output XML>

The input documents are searched for the pattern in the WHERE part of the query. Data bindings, which are specified in the pattern, are used to construct the output XML. Note that the output XML does not have to be a well-formed document with matching start and end tags, nor does it have to conform to any DTD. Important operational features of XML-QL include:

Support for navigation in the search pattern of a query. This navigation can be expressed using path expressions.

The ability to join and relate information from multiple input documents in a single query.

Support for nested subqueries in the CONSTRUCT part of a query.

The ability to generate output XML with a different structure than the input documents.

Other XML query languages that have been proposed generally support only a subset of the above operational features. For example, the XML Query Language (XQL) does not support joins, subqueries, or the ability to generate output with a different structure than its input document. XQL is described at the URL:

<www.w3.org/tandS//QL/QL98/xql.html>

XML is likely to become a future standard for information exchange between peer data stores, and between client visualization tools and data servers. Most business data will probably continue to be stored in relational database systems, however. Thus, there is a need for a mechanism to publish and query relational data as XML.

SUMMARY OF THE INVENTION

To overcome the limitations in the prior art described above, and to overcome other limitations that will become apparent upon reading and understanding the present specification, the present invention discloses a method, apparatus, and computer program product to translate XML queries into queries against a relational database to publish relational data as XML. Each relational table is mapped to a virtual XML document, and XML queries are issued over these virtual documents. An XML query is parsed and transformed into a language-neutral intermediate representation, which is a sequence of operations describing how the output document is derived from the underlying relational tables. The intermediate representation is then translated into an SQL query over the underlying relational tables and into instructions for a tagger. The SQL query is executed, and the SQL query results are then fed into the tagger, which follows its instructions to generate the marked up output.

BRIEF DESCRIPTION OF THE DRAWINGS

Referring now to the drawings in which like reference numbers represent corresponding parts throughout:

FIG. 3 depicts the mapping of a relational table to its Default View in XML according to the preferred embodiment of the present invention.

FIG. 4 is an exemplary XML query over the Default View and its output.

DETAILED DESCRIPTION OF THE PREFERRED EMBODIMENT

Overview

The preferred embodiment of the present invention describes a distributed computing architecture for use on the World Wide Web (WWW). Specifically, a server uses a relational database system as its data store. A mapping is established from each table in the database to a virtual XML document. Clients (or other servers) query these virtual documents using XML-QL. An XML-QL query is transformed into a language-neutral intermediate representation. The intermediate representation is then translated into an SQL query over the underlying relational table, and into tagging instructions. The SQL query is executed and the SQL query results are then fed into the tagger, which follows the tagging instructions to generate the marked up output from the SQL query results. Those skilled in the art will recognize that another XML query language could be used in place of XML-QL without departing from the scope of the present invention.

Hardware Environment

Figure 1:
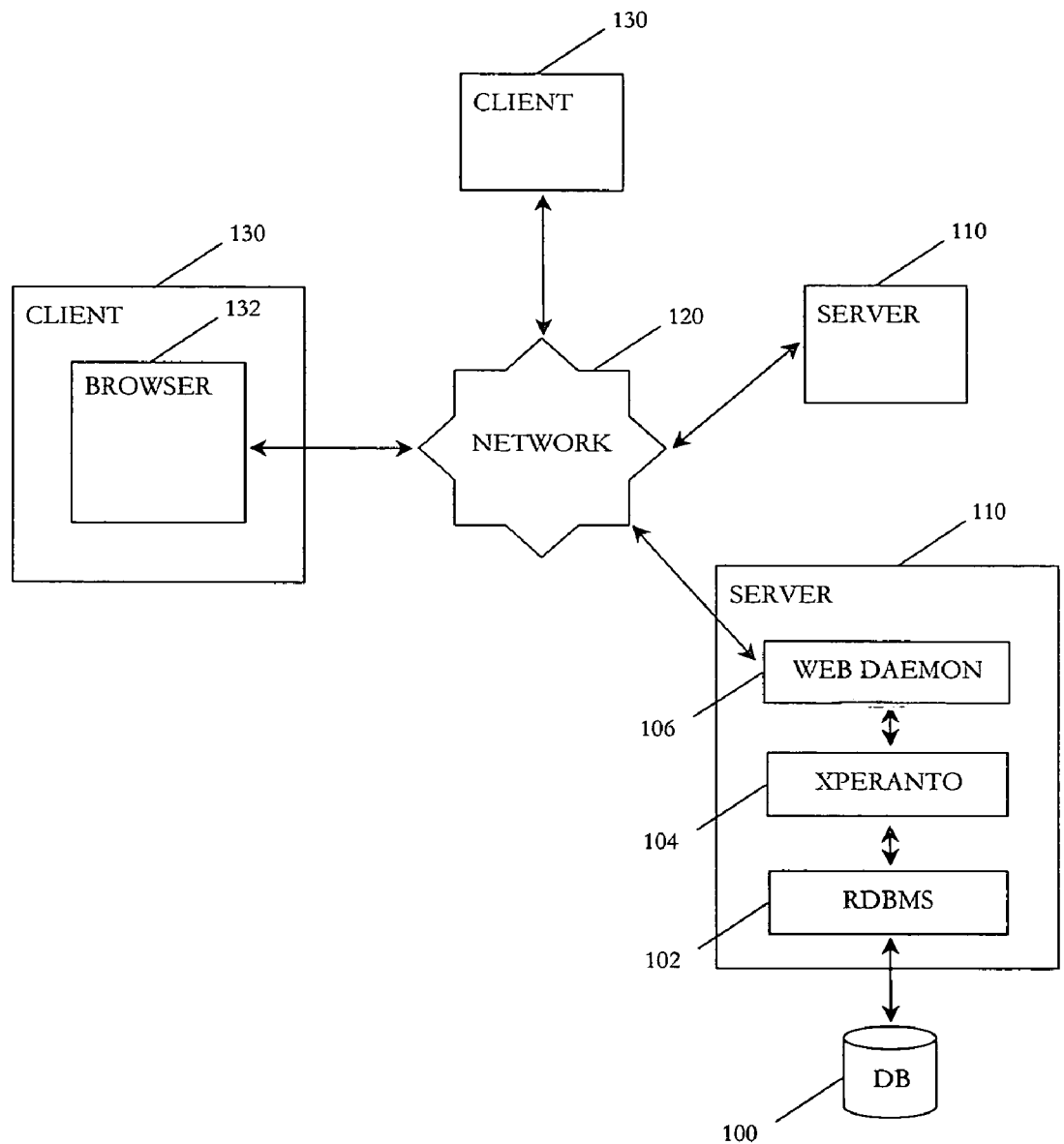
FIG. 1 is a schematic diagram of the hardware environment of the preferred embodiment of the present invention.

FIG. 1 schematically illustrates an exemplary computer hardware environment that could be used with the present invention, and more particularly, illustrates a typical distributed computing architecture using a network 120 to connect clients 130 and servers 110. Clients 130, which may include Web browsers 132, connect to servers 110, which execute server software such as Web daemons 106. Server-to-server connections may also be established using Web daemons 106. A typical combination of resources may include clients 130 that are personal computers, or workstations, and servers 110 that are personal computers, workstations, minicomputers, or mainframes. These systems may be coupled to one another over network 120, which may include other networks such as LANs, WANs, SNA networks, as well as the Internet.

The preferred embodiment of the present invention comprises a system known as Xperanto 104, which maps each table in RDBMS 102 (describing contents of a database 100) to a virtual XML document. Queries in XML-QL are issued over these virtual documents. Xperanto 104 translates an XML-QL query to an SQL query over the underlying relational tables. The SQL query is executed against RDBMS 102, and the results of the SQL query are then marked up by Xperanto 104 to form the desired output XML.

In general, Xperanto 104 comprises data and instructions which, when read, interpreted, and executed by server 110, cause server 110 to perform the steps of the present invention. Generally, the data and instructions are embodied in and readable from a device, carrier or media, such as memory, data storage devices, and remote devices coupled to server 110 via a data communications device (not shown).

However, those skilled in the art will recognize that the exemplary environment and components illustrated in FIG. 1 are not intended to limit the present invention. Indeed, those skilled in the art will recognize that other alternative hardware environments may be used without departing from the scope of the present invention. Thus, the present invention may be implemented as a method, apparatus, or article of manufacture using standard programming and engineering techniques to produce software, hardware, firmware, or any combination thereof. In addition, the term "article of manufacture" as used herein is intended to encompass logic and data embodied in or accessible from any device, carrier, or media.

Operation of the Invention

Figure 2:
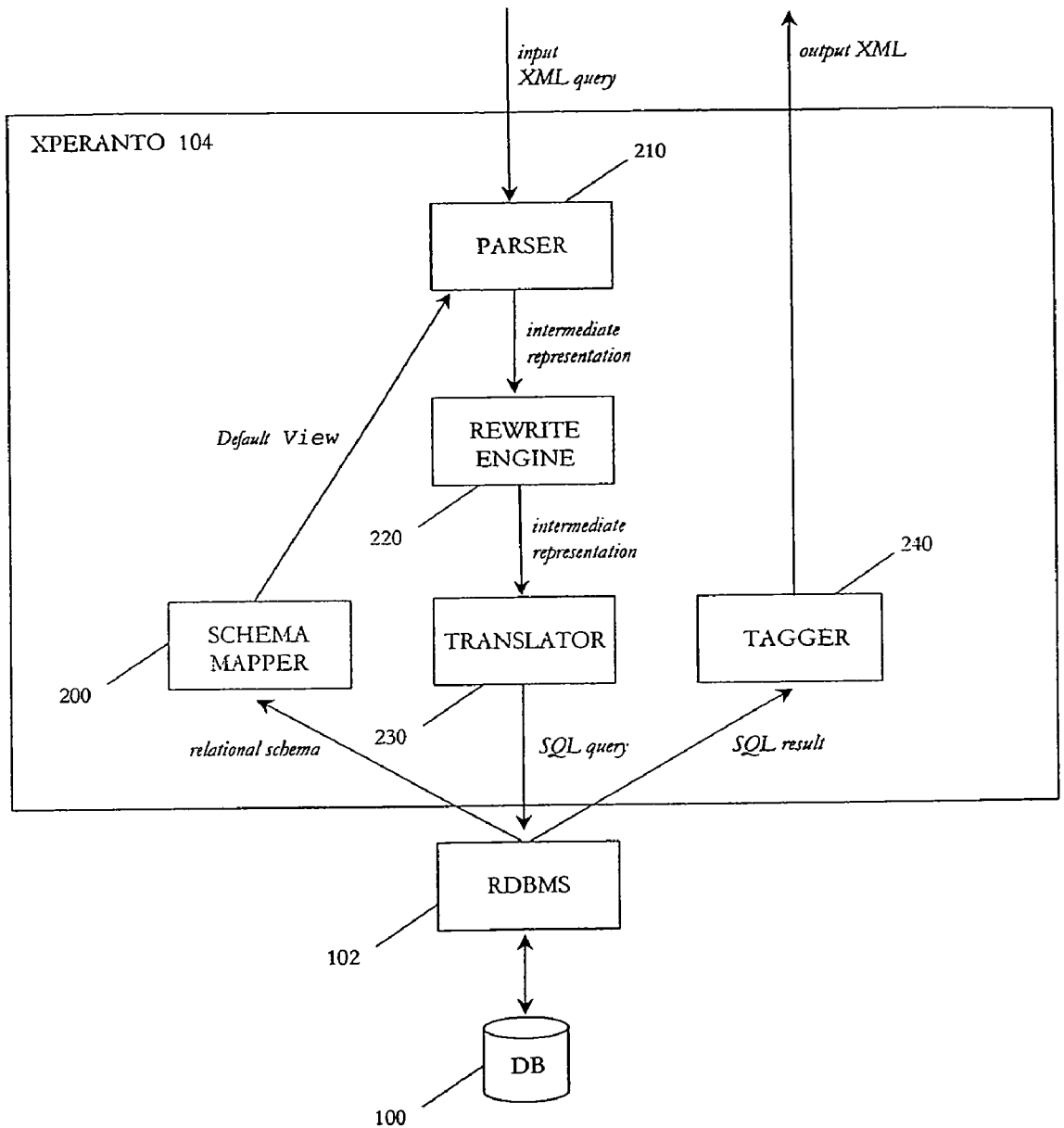
FIG. 2 is a block diagram depicting the Xperanto system of the preferred embodiment of the present invention.

FIG. 2 is a block diagram that illustrates the components of Xperanto system 104. In the preferred embodiment, Xperanto system 104 is comprised of five major components: a schema mapper 200, a parser 210, a rewrite engine 220, a translator 230, and a tagger 240.

Schema mapper 200 establishes a default XML schema (the Default View) for the data stored in RDBMS 102. Each table is mapped to a virtual XML document over which XML queries are issued. These are virtual XML documents in the sense that they are preferably never materialized. Only the results of XML queries are materialized.

Parser 210 converts an XML query to a language-neutral intermediate representation. The intermediate representation is a sequence of operations that describe how the marked up output of the XML query is derived from the underlying relational tables. It includes operations to construct new XML elements from data bindings.

Rewrite engine 220 takes the intermediate representation generated by parser and converts it to an equivalent form that may be easily translated to an SQL query.

Translator 230 translates the rewritten intermediate representation into:
(1) an SQL query over the underlying relational tables and
(2) instructions for tagger 240.

Tagger instructions describe how to generate the marked up output from the SQL query results. The SQL query is executed, and the SQL query results are fed into tagger 240, which then generates marked up output according to its instructions.

Using the above components, Xperanto 104 provides the means to establish a mapping from a relational schema to an XML schema and the means to issue XML queries against that XML schema for the purpose of publishing relational data as XML.

As its name implies, the Default View provides a default XML view of the relational data. In Xperanto 104, alternative views of the data may be manually defined using XML queries, since each query effectively defines a different view of the data. XML queries may then be issued over these alternative views and the Default View. Note that views may be defined on top of views by recursive application of this procedure.

The Default View

FIG. 3 provides an exemplary Default View for a department and employee database, consisting of a DEPT table 300 and an EMP table 310. The DNO and ENO columns in tables 300 and 310 uniquely identify the department number and employee number, respectively. As shown, the table name (either DEPT or EMP) is used as the tag for the outer-most XML element in the Default View. Each row in a table is mapped to a ROW element. Within a ROW element, each column of the table is mapped to an element with the column's name as its tag. Those skilled in the art will recognize that another schema mapping could be used in the Default View without departing from the scope of the present invention.

A Query Over the Default View

FIG. 4 provides an exemplary XML-QL query over the Default View of FIG. 3. The query provides the names of departments with more than 75 employees. The WHERE part of the query specifies the search criteria, namely that only departments with more then 75 employees are to be selected. It also specifies data bindings for DNO, NAME, and BUDGET. The CONSTRUCT part of the query specifies the structure of the output XML. As shown, a nested subquery appears within the CONSTRUCT. The subquery is used to nest employees with their departments. The binding for DNO is used to relate departments and employees in the subquery.

The Intermediate Representation

The intermediate representation is a sequence of parameterized operations that describe how the output of the XML-QL query is derived from the underlying relational tables. The input of each operation is one or more tables, and the output is another table. Each row of a table has a number of columns, where a column is either an atomic data value, such as an integer, or XML.

Various operations in the intermediate representation are described below. Each operation's name is given along with a list of input parameters. The list of input parameters is not necessarily exhaustive. Only key parameters are described:

BIND(X, B): This operation binds variables to data values. It produces an output table consisting of all the possible data bindings B for the input document X.

SELECT (S): This operation selects data. It applies S to each row of its input table and produces an output table consisting of rows that satisfy S.

CONSTRUCT(T, O): This operation constructs new XML elements. For each row of the input table, the data bindings in the XML template T are instantiated. The resulting XML element is assigned to column O of the output table.

JOIN(R): This operation has the same semantics as a join in an RDBMS. R is a predicate that is used to relate the two input tables.

GROUP(C, X, O): This operation groups related XML elements. The input table is grouped on column(s) C. Within a group, column X of the input table is concatenated and assigned to column O in the output. If C is empty, one group is created for the whole input table.

NEST(R, X, O): This operation nests XML elements in a parent-child relationship. It takes two input tables, with one playing the role of the parent and the other playing the role of the child. R is a predicate that used to relate a parent and child. Children are grouped with their parent. Within a group, column X of the child table is concatenated and assigned to column O in the output.

Those skilled in the art will recognize that another intermediate representation with different operations could be used without departing from the scope of the present invention. In general, operations are needed to establish the selection criteria to be applied to the input documents, the required relationships between the input documents, and the structure of the output XML.

Figure 5:
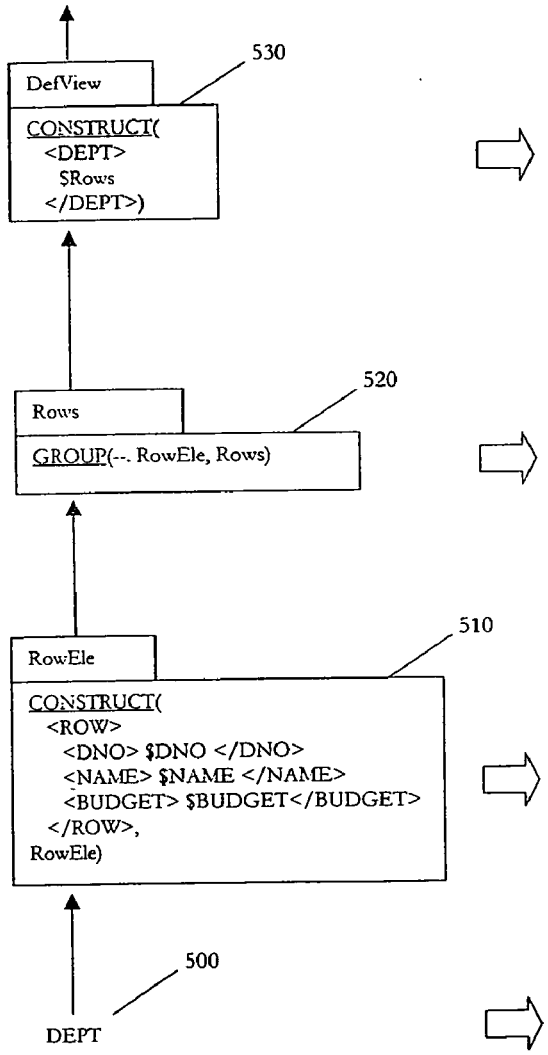
FIG. 5 illustrates the Intermediate Representation of the Default View according to the preferred embodiment of the present invention.

FIG. 5 shows the intermediate representation for the Default View of DEPT table 300 in FIG. 3. Working from the bottom up, DEPT table 300 is accessed and input to a CONSTRUCT operation 510. For each row, data bindings from the DNO, NAME, and BUDGET columns are used to construct a ROW element, which is assigned to the RowEle column. ROW elements are then concatenated by a GROUP operation 520 and assigned to the Rows column. Finally, a second CONSTRUCT operation 530 adds the DEPT tag, and the resulting XML is assigned to the DefView column. The intermediate representation for the Default View of the EMP table would look similar.

Figure 6:
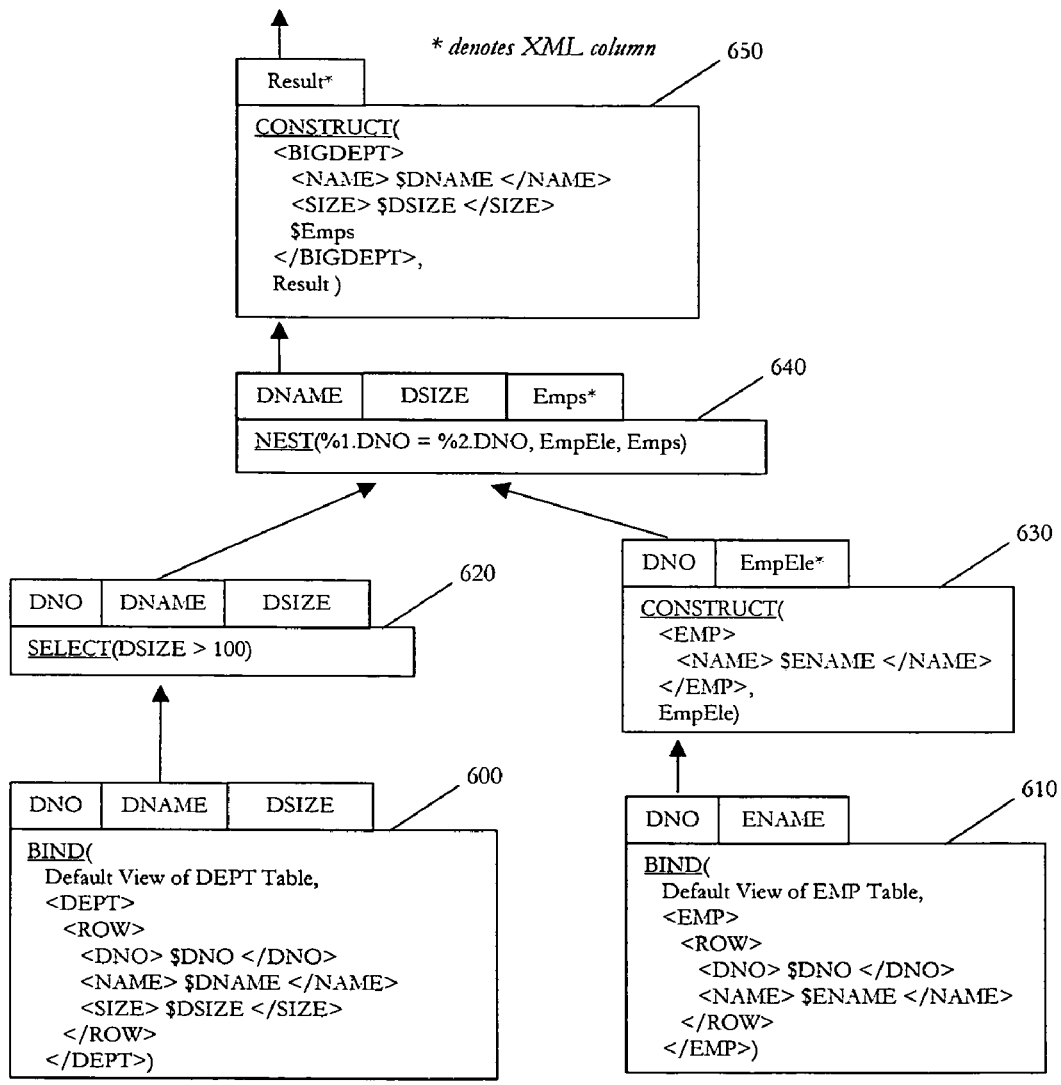
FIG. 6 illustrates the Intermediate Representation of a query over the Default View according to the preferred embodiment of the present invention.

FIG. 6 shows the intermediate representation for the query in FIG. 4. As shown, the starting point is the Default View of the DEPT and EMP tables 300 and 310. BIND operations 600 and 610 map the Default View back into a table. The marked up output is constructed by operations 630, 640, and 650. CONSTRUCT operation 630 constructs EMP elements, and NEST operation 640 groups EMP elements with the same DNO. Finally, CONSTRUCT operation 650 generates a BIGDEPT element for each department with size greater than 100, as selected by SELECT operation 620.

The Rewrite Engine

Rewrite engine 220 takes the intermediate representation generated by parser 210 and converts it to an equivalent form that may be easily translated to an SQL query. More specifically, operations to construct and group XML elements are reordered to appear last in the rewritten intermediate representation. The steps to carry out the rewrite process are as follows:

1) Let S denote the sequence of CONSTRUCT, GROUP, and CONSTRUCT operations following a table access for the Default View of a table T. Whenever S is followed by a BIND operation B, eliminate both S and B, leaving just the table access for T.

2) Let N denote a NEST operation and S denote any sequence of CONSTRUCT and GROUP operations for the child input of N. N is replaced by a JOIN operation, followed by S and a new GROUP operation G, which performs the child grouping that was previously done by N.

Figure 7:
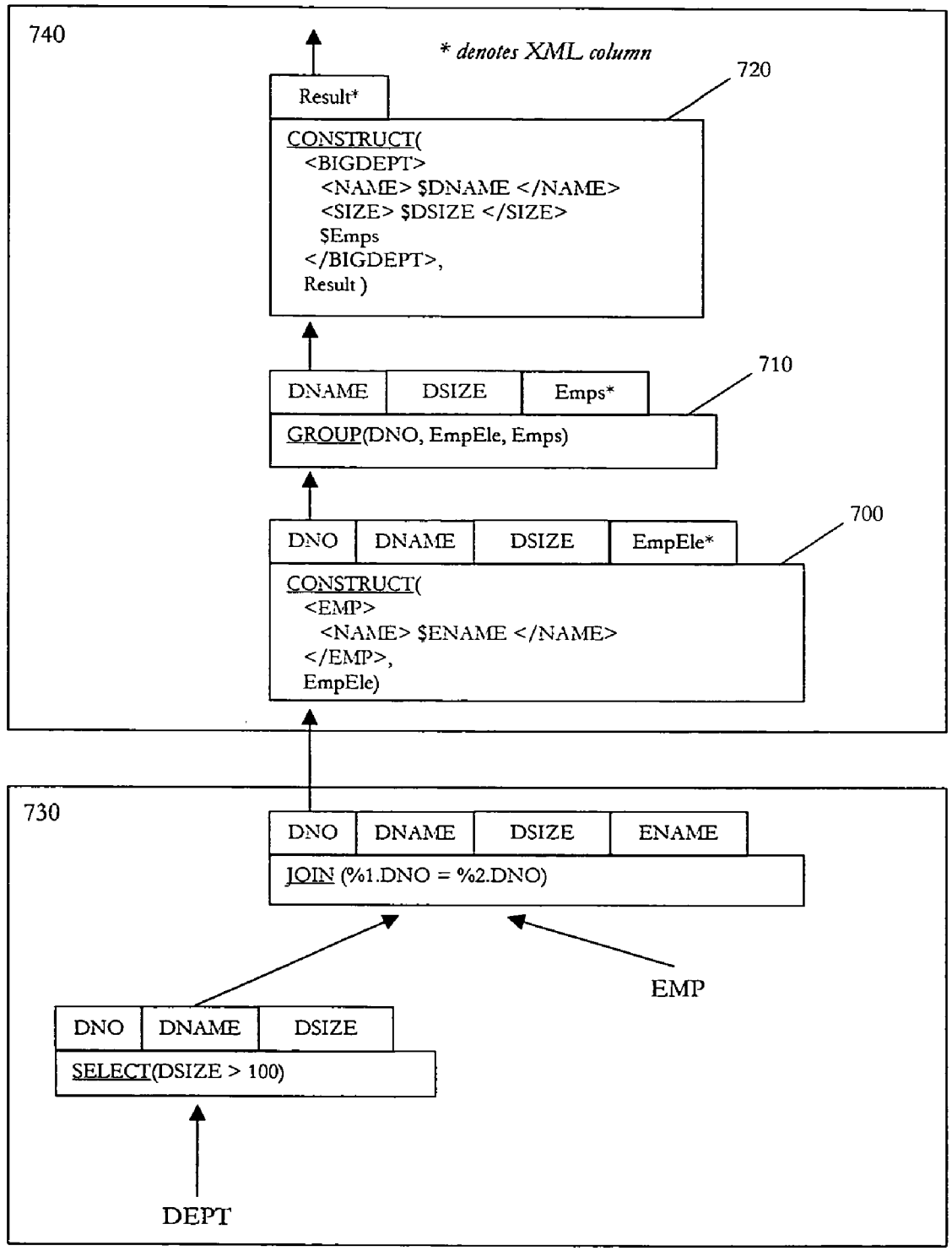
FIG. 7 illustrates the rewritten form of the Intermediate Representation according to the preferred embodiment of the present invention.

FIG. 7 shows the rewritten version of the intermediate representation in FIG. 6. As shown, the operations to construct and group XML elements now appear last. FIG. 7 is for a query with only single level of nesting. However, deeper levels of nesting can be handled by repeated application of steps 1) and 2).

Those skilled in the art will recognize that different rewrite steps could be used without departing from the scope of the present invention. In general, rewrite engine 220 converts the intermediate representation to an equivalent form where operations to generate the structure of the output XML are performed last.

Translation

Translator 230 takes the intermediate representation produced by rewrite engine 220 and translates it to: (1) an SQL query over the underlying relational tables; and (2) tagger instructions. More specifically, operations on the intermediate representation are partitioned into two groups: operations that select and relate data 730, and operations that construct and group XML elements 740. Operations that select and relate data 730 are translated into an SQL query, while operations that construct and group XML elements 740 (including CONSTRUCT operation 700, GROUP operation 710, and CONSTRUCT operation 720) are translated into tagger instructions.

Figure 8:
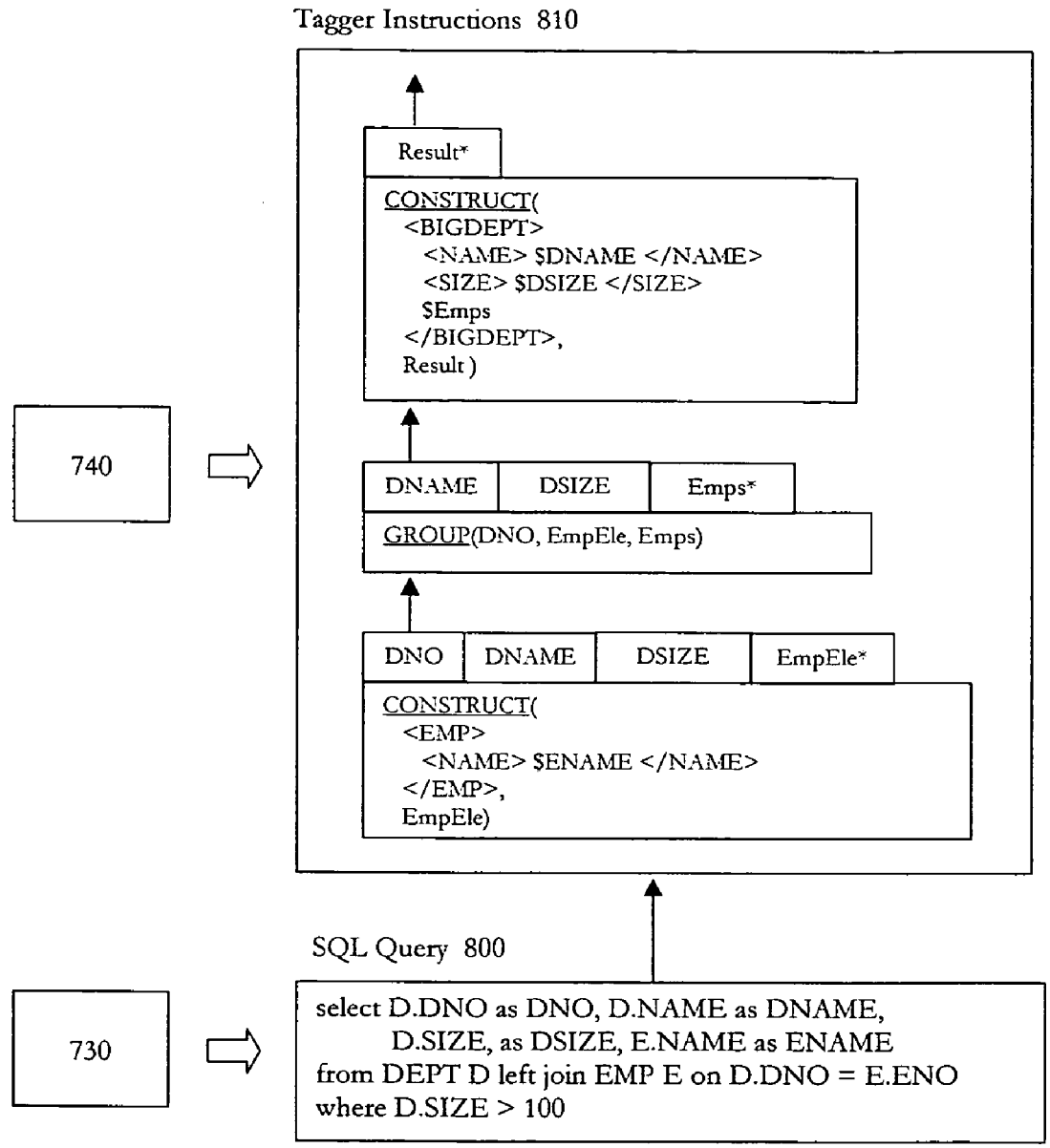
FIG. 8 illustrates the translation of the Intermediate Representation to a query over the relational database according to the preferred embodiment of the present invention.

FIG. 8 shows the translation of the intermediate representation into an SQL query 800 and tagger instructions 810. A straightforward translation from the intermediate representation into SQL query 800 is shown. Those skilled in the art will recognize that a different SQL translation could be used without departing from the scope of the present invention. Any SQL query that establishes the selection criteria and relationships among data will suffice. The intermediate representation itself is used as the tagger instructions 810. Those skilled in the art will recognize that a different instruction format could be used without departing from the scope of the present invention. Any instruction format that describes how to generate the marked up output from the results of the SQL query will suffice.

Query Execution

To produce the XML result, SQL query 800 is executed and its results are fed into tagger 240 of Xperanto 104. Tagger 240 uses tagger instructions 810 to generate the marked up output.

Figure 9:
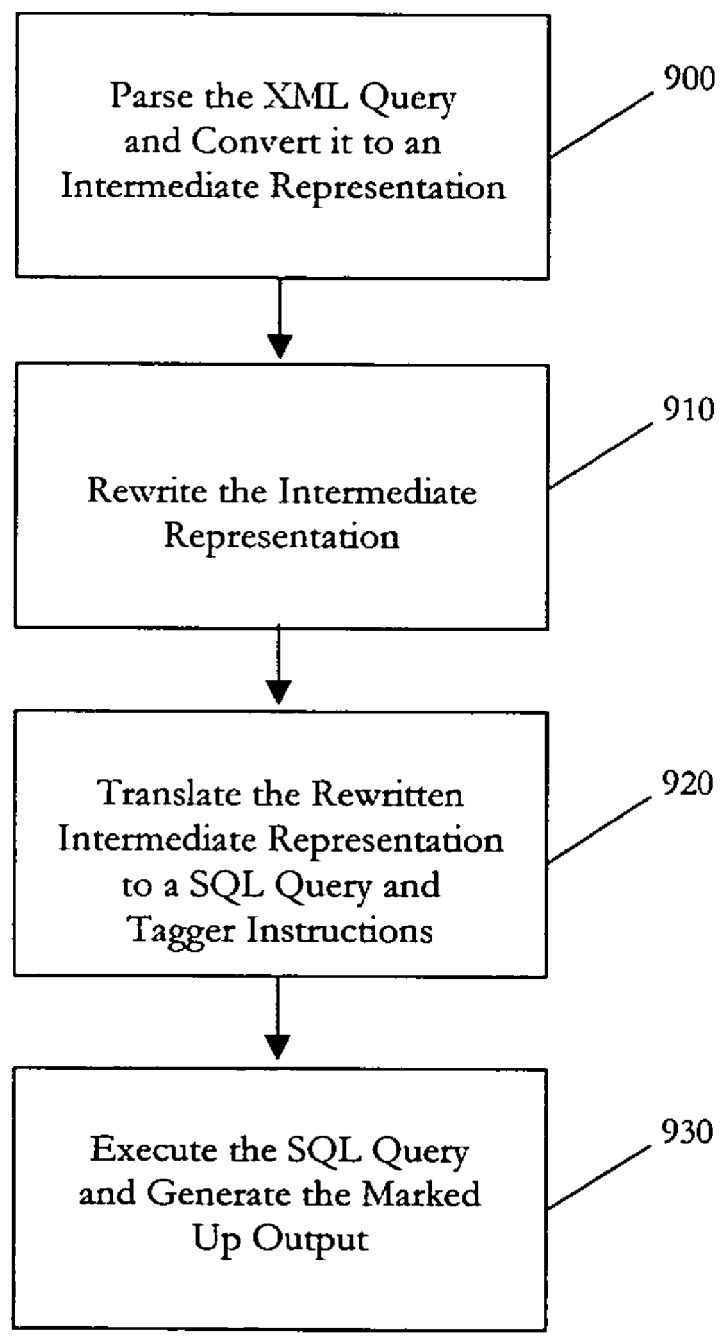
FIG. 9 is a flowchart that illustrates the method steps performed by the preferred embodiment of the present invention.

FIG. 9 is a flowchart that illustrates the method steps performed by the preferred embodiment of the present invention.

Block 900 represents the parsing of an XML query. Schema mapper 200 establishes a default XML schema (the Default View) for the data stored in RDBMS 102. Each table is mapped to a virtual XML document over which XML queries are issued. Parser 210 converts the XML query to a language-neutral intermediate representation, which is a sequence of operations that describe how the marked up output of the XML query is derived from the underlying relational tables.

Block 910 represents the rewriting of the intermediate to an equivalent form that may be easily translated into an SQL query. More specifically, operations to construct and group XML elements 740 are reordered to appear last in the rewritten intermediate representation.

Block 920 represents the translation of the intermediate representation to: (1) SQL query 800 over the underlying relational table; and (2) tagging instructions 810 for tagger 240. Operations that select and relate data 730 are translated into SQL query 800, which establishes the selection criteria and relationships among data. Operations that construct and group XML elements 740 are translated into tagger instructions 810, which describe how to generate the marked up output from the results of SQL query 800.

Block 930 represents the execution of SQL query 800. The results of SQL query 800 are fed into tagger 240, which follows tagger instructions 810 to generate the marked up output.

In the foregoing description of the preferred embodiment, reference is made to the accompanying drawings that form a part hereof, and in which is shown by way of illustration a specific embodiment in which the invention may be practiced. It is to be understood that other embodiments may be utilized and that structural and functional changes or other modifications and variations may be made without departing from the scope of the present invention. For example, any type of computer, such as a mainframe, minicomputer, or personal computer, could be used to implement the present invention. In addition, the present invention is not limited by specific document formats or document query languages. For example, the present invention could also be used with HTML or SGML. The description of the preferred embodiment has been presented for the purposes of illustration and description, and is not intended to be exhaustive or to limit the invention to the precise form disclosed. It is intended that the scope of the invention be limited not by this detailed description but rather by the claims appended hereto.

We claim:

1. A method of publishing relational data as XML, comprising the method steps of:

mapping a number of relational database tables to a number of virtual XML documents;

issuing XML queries over said virtual XML documents;

parsing said XML queries;

transforming said XML queries into a language-neutral intermediate representation;

rewriting said language-neutral intermediate representation into an equivalent form easily translated into an SQL query;

translating said equivalent form into an SQL query over said relational database tables and into tagging instructions passed to a tagger;

executing said SQL query to produce SQL query results passed to said tagger; and generating XML output using said SQL query results and said tagging instructions.

2. The method of claim 1 wherein said method operates over a distributed computing network.

3. The method of claim 2 wherein said method operates over the Internet.

4. The method of claim 1 wherein said mapping step operates recursively.

5. The method of claim 1 wherein said mapping step operates manually.

6. The method of claim 1 wherein said mapping step maps said relational database tables to said virtual XML documents in a one-to-one manner.

7. The method of claim 1 wherein said language-neutral intermediate representation includes a sequence of operations describing:

how to select and relate data from said relational database tables; and how to construct and group new XML elements from data bindings.

8. The method of claim 7 wherein said transforming step operates on at least one said relational database table and produces at least one output table.

9. The method of claim 7 wherein said operations include BIND operations.

10. The method of claim 7 wherein said operations include SELECT operations.

11. The method of claim 7 wherein said operations include CONSTRUCT operations.

12. The method of claim 7 wherein said operations include JOIN operations.

13. The method of claim 7 wherein said operations include GROUP operations.

14. The method of claim 7 wherein said operations include NEST operations.

15. The method of claim 1 wherein said rewriting step includes the further steps of:

eliminating both S and B whenever S is followed by a BIND operation B, where S denotes the sequence of CONSTRUCT, GROUP, and CONSTRUCT operations following a table access for a default view of a table T, leaving just the table access for T; and replacing N by a JOIN operation, followed by S and a new GROUP operation which performs the child grouping that was previously done by N, where N denotes a NEST operation and S denotes any sequence of CONSTRUCT and GROUP operations for the child input of N.

16. The method of claim 1 wherein said rewriting step may operate repeatedly for deeper levels of nesting.

17. The method of claim 1 wherein said tagger operates outside an RDBMS.

18. The method of claim 7 wherein said operations describing how to select and relate data are translated into an SQL query that establishes selection criteria and required relationships among data.

19. The method of claim 7 wherein said operations describing how to construct and group new XML elements are translated into said tagger instructions.

20. The method of claim 19 wherein said operations are reordered to be performed last.

21. The method of claim 19 wherein said language-neutral intermediate representation serves as said tagging instructions.

22. A system for publishing relational data as XML, comprising:
 a schema mapper for mapping a number of relational database tables to a number of virtual XML documents;
 an XML-QL engine for issuing XML queries over said virtual XML documents;
 a parser for parsing said XML queries and for transforming said XML queries into a language-neutral intermediate representation;
 a rewrite engine for rewriting said intermediate representation into an equivalent form easily translated into an SQL query;
 a translator for translating said equivalent form into an SQL query over said relational database tables and into tagging instructions;
 an RDBMS for executing said SQL query to produce SQL query results; and
 a tagger for generating XML output using said SQL query results and said tagging instructions.

23. The system of claim 22 wherein said system operates over a distributed computing network.

24. The system of claim 23 wherein said system operates over the Internet.

25. The system of claim 22 wherein said schema mapper operates recursively.

26. The system of claim 22 wherein said schema mapper operates manually.

27. The system of claim 22 wherein said schema mapper maps said relational database tables to said virtual XML documents in a one-to-one manner.

28. The system of claim 22 wherein said language-neutral intermediate representation includes commands controlling how said system:
 selects and relates data from said relational database tables; and,
 constructs and groups new XML elements from data bindings.

29. The system of claim 28 wherein said parser operates on at least one said relational database table and produces at least one output table.

30. The system of claim 28 wherein said system performs BIND operations.

31. The system of claim 28 wherein said system performs SELECT operations.

32. The system of claim 28 wherein said system performs CONSTRUCT operations.

33. The system of claim 28 wherein said system performs JOIN operations.

34. The system of claim 28 wherein said system performs GROUP operations.

35. The system of claim 28 wherein said system performs NEST operations.

36. The system of claim 22 wherein said rewrite engine:
 eliminates both S and B whenever S is followed by a BIND operation B, where S denotes the sequence of CONSTRUCT, GROUP, and CONSTRUCT operations following a table access for a default view of a table T, leaving just the table access for T; and
 replaces N by a JOIN operation, followed by S and a new GROUP operation which performs the child grouping that was previously done by N, where N denotes a NEST operation and S denotes any sequence of CONSTRUCT and GROUP operations for the child input of N.

37. The system of claim 22 wherein said rewrite engine may operate repeatedly for deeper levels of nesting.

38. The system of claim 22 wherein said tagger operates outside an RDBMS.

39. The system of claim 28 wherein said system translates commands describing how to select and relate data into an SQL query that establishes selection criteria and required relationships among data.

40. The system of claim 28 wherein said system translates commands describing how to construct and group new XML elements into said tagger instructions.

41. The system of claim 40 wherein said commands are reordered to be performed last.

42. The system of claim 40 wherein said language-neutral intermediate representation serves as said tagging instructions.

43. A system for publishing relational data as XML, comprising:
 means for mapping a number of relational database tables to a number of virtual XML documents;
 means for issuing XML queries over said virtual XML documents;
 means for parsing said XML queries and for transforming said XML queries into a language-neutral intermediate representation;
 means for rewriting said intermediate representation into an equivalent form easily translated into an SQL query;
 means for translating said equivalent form into an SQL query over said relational database tables and into tagging instructions;
 means for executing said SQL query to produce SQL query results; and
 means for generating XML output using said SQL query results and said tagging instructions.

44. A computer program product comprising a machine-readable medium including machine-executable instructions therein for publishing relational data as XML comprising the steps of:
 mapping a number of relational database tables to a number of virtual XML documents;
 issuing XML queries over said virtual XML documents;
 parsing said XML queries;
 transforming said XML queries into a language-neutral intermediate representation;
 rewriting said language-neutral intermediate representation into an equivalent form easily translated into an SQL query;
 translating said equivalent form into an SQL query over said relational database tables and into tagging instructions passed to a tagger;
 executing said SQL query to produce SQL query results passed to said tagger; and
 generating XML output using said SQL query results and said tagging instructions.

* * * * *

UNITED STATES PATENT AND TRADEMARK OFFICE
CERTIFICATE OF CORRECTION

PATENT NO.     : 6,947,945 B1  
DATED          : September 20, 2005  
INVENTOR(S)    : Michael James Carey et al.

It is certified that error appears in the above-identified patent and that said Letters Patent is hereby corrected as shown below:

<u>Title page,</u>  
Item [75], Inventors, replace "Narayana Iyer" with -- Narayana Iyer Subramanian --.

Signed and Sealed this

Twenty-ninth Day of November, 2005

JON W. DUDAS  
*Director of the United States Patent and Trademark Office*